Dec. 27, 1927. 1,654,425
T. J. MARQUIS ET AL
MEAT GRINDER HEAD
Filed Oct. 8, 1926  2 Sheets-Sheet 1
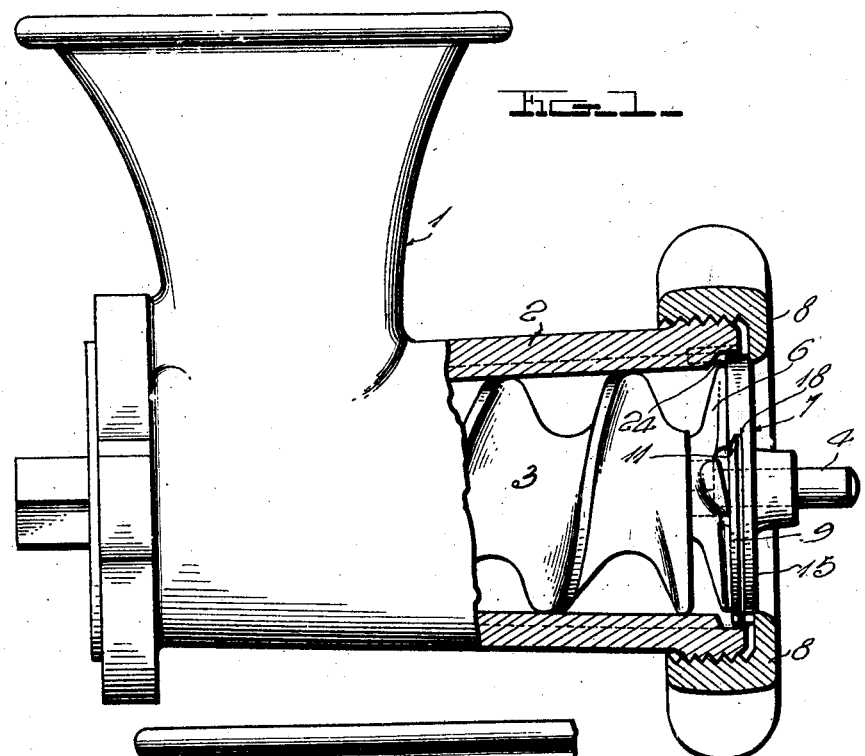
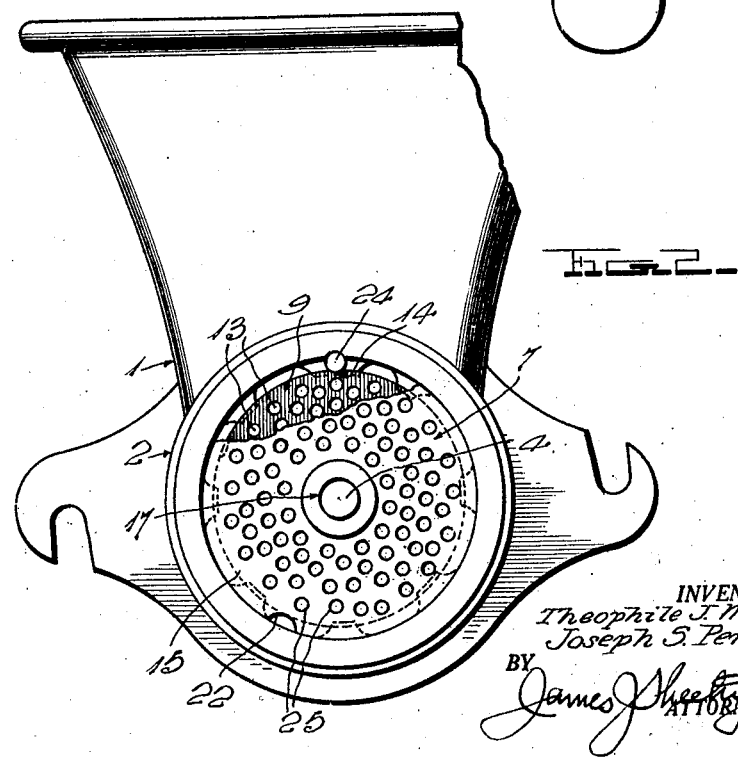
INVENTORS.
Theophile J. Marquis
Joseph S. Perrault
BY
ATTORNEYS.

Dec. 27, 1927.
T. J. MARQUIS ET AL
1,654,425
MEAT GRINDER HEAD
Filed Oct. 8, 1926
2 Sheets-Sheet 2
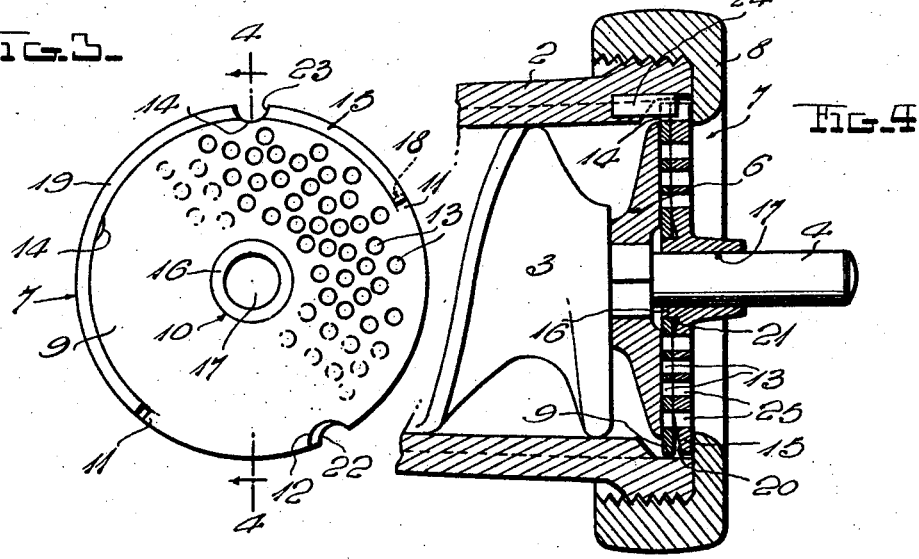
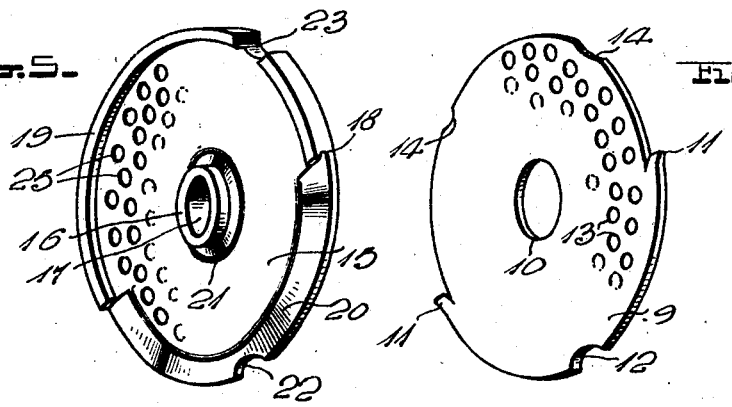
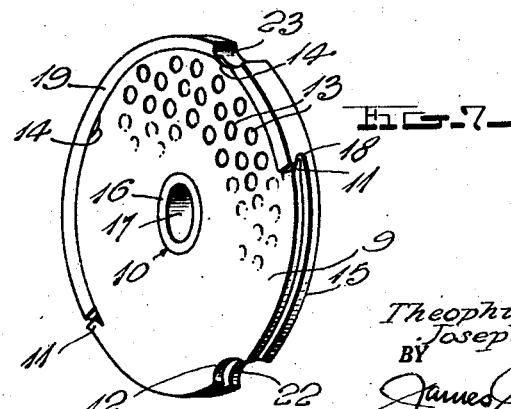
INVENTORS
Theophile J. Marquis
Joseph S. Perrault
BY
ATTORNEYS Patented Dec. 27, 1927.

1,654,425

UNITED STATES PATENT OFFICE.

THEOPHILE J. MARQUIS AND JOSEPH S. PERRAULT, OF NASHUA, NEW HAMPSHIRE.

MEAT-GRINDER HEAD.

Application filed October 8, 1926. Serial No. 140,353.

Our present invention pertains to meat cutters and it contemplates the provision of a simple and inexpensive cutter that is provided with a reversible plate adjacent the follower that is so constructed and arranged so that when the cutting plate is reversed the cutting of meat or other material will be accomplished as is customary with cutter plates having non-reversible qualities.

The invention further contemplates the provision of means for retaining the cutter plate with respect to the follower in rigid manner regardless as to which surface of the cutter is being used.

Other objects and characteristic advantages of the invention will be fully understood from the following description and claims when the same are read in connection with the drawings accompanying and forming part of this specification in which:

Figure 1 is a side elevation of a meat chopper showing the same as applied in connection with our device with parts of the meat chopper head cut away.

Figure 2 is a front elevation with parts broken away.

Figure 3 is a rear elevation of our novel reversible plate.

Figure 4 is a section on the line 4—4 of Figure 3, with parts of the meat head chopper being shown in section.

Figures 5 and 6 are perspective views of the plate separated.

Figure 7 is a perspective view of the assembled plate.

Similar numerals of reference designate corresponding parts in all the views of the drawings.

Our novel reversible plate is adapted for use in connection with a meat chopper head 1 having the barrel 2 and the usual spiral 3 arranged on the shaft 4. The shaft is further provided with the cutting blade 6 and adapted to be arranged on the shaft is our novel reversible plate 7 indicated as a whole. Threaded on the barrel 2 is a screw cap 8 for holding the plate with respect to the shaft while 9 indicates the inner element or plate that is provided with an opening 10 and the said plate 9 is further provided with the barbs or tongues 11 while at 12 we provide the finger notch as illustrated. This plate 9 is foraminous at 13 while further provided in the peripheral edge of the plate 9 are the lock notches 14. Our novel reversible plate further comprises the outer plate or element 15 having the hub or flange 16 that is adapted to engage and rest in the opening 10 of the plate 9. The member 15 is further provided with the shaft receiving opening 17. A novel feature of the member 15 is the notch 18 that is adapted to receive the tongues or barbed elements 11 of the plate 9 whereby the plate 9 will be securely retained with respect to the plate 15 while at 19 we provide the flange that receives a portion of the plate 9. The plate 9 is also provided with finger notches as shown. The plate 15 is further provided with a bevelled edge portion 20 while the hub 16 is provided with an inner bevel 21. At 22 and 23 we provide the finger notches that rest in alinement with the finger notch 14 of the plate 9 when our device is assembled. The plate 15 is foraminous as indicated by 25 and at 24 we arrange a lock pin to firmly secure the plates 9 and 15 to each other.

It will be gathered from the foregoing that the plate 9 will rest with one of the edges thereof in the flange 19 of the plate 15 and that the fingers 11 will seat into the notches 18 of the plate 15 regardless of the surface of the plate that abuts the plate 15. This will permit of reversing the plate 9 with respect to the plate 15. Furthermore a smooth surface as well as a snug fit will be produced regardless of the surface of the plate 9 that abuts the surface 15.

We would distinctly have it understood that the follower plate of our novel device is flanged approximately one-half of its circumference and is provided with a hub in the center thereof and in combination with the flanged edge this hub holds the plate 9 thereon. This flange 19 further acts to stop movement of the plate 9 with respect to the plate 15 and the slight under cut retains the plates with respect to each other. The construction of the bevelled edge of the tongues 11 permits the tongues to seat in the under cut surface of the plate 15. It will also be observed that due to the bevelling of the hub with the under cut surface 21, when the plate is reversed after said plate has been used on one side and due to wear ridges have been produced in the center thereof, the said plate 9 will rest flat against the plate 15. Without this under cutting as well as the under cutting 19 the cutter blade 6 that produces a flange or ridge in the plate 9 would prevent the plate 9 from snugly and flatly resting against the plate 15.

It will be gathered from the foregoing that the device is extremely simple in construction and that the plate can be reversed with but a slight amount of effort on the part of the operator.

What we claim is:—

1. A reversible plate for meat cutter heads comprising two elements, one of which is provided with a body portion, a flange formed in the center of the body portion and having a beveled surface, a bevel formed on a portion of one surface of the body portion, a flange formed on a portion of the peripheral surface of the body portion, finger notches formed on the peripheral edge of the body portion, other notches formed in the peripheral flange at the termination of the peripheral bevel of the body portion, the other element comprising a plate having finger notches alined with the finger notches of the first element and barbs formed on the second element one of which is bent reversely to the other and adapted to be engaged by the notches in the peripheral flange of the body portion regardless of the surface abutting the first element whereby a firm contact is accomplished between the element despite wear incident to rotation of the cutter blades of the meat grinder head.

2. The combination with a meat grinder head of a cutter plate composed of two elements one of which is provided with a flange on a portion thereof, and at the peripheral edge, a hub formed in the center of said element and having a beveled portion, notches formed in the ends of the flange, a beveled surface extending from one to the other of the ends of the flange and formed on the peripheral edge of the element; the other element comprising a plate adapted to have a portion thereof engaged by the flange and barbs formed on the plate and adapted to seat in the notches of the flange, and further constructed and arranged so that reversing of the second element will lock said element to the first element, means comprising a pin adapted to rigidly hold the elements to each other and foraminations formed in each of the elements.

3. A cutter plate comprising two members, one of which is provided with a flanged peripheral edge on a portion of the surface thereof and a beveled edge on the remaining peripheral surface thereof, notches formed in the ends of the flanges and a plate having means so constructed and arranged that regardless of the surface abutting the first member, said elements will be locked with respect to each other.

In testimony whereof we have hereunto set our hands.

THEOPHILE J. MARQUIS.
JOSEPH S. PERRAULT.